Patented Feb. 17, 1948

2,436,144

UNITED STATES PATENT OFFICE 2,436,144

VINYL FLUOROACETATES AND POLYMERS DERIVED THEREFROM

Benjamin W. Howk, Wilmington, Del., and Ralph A. Jacobson, Landenburg, Pa., assignors to E. I. du Pont de Nemours & Company, Wilmington, Del., a corporation of Delaware No Drawing. Application March 20, 1944, Serial No. 527,340

3 Claims. (Cl. 260—87)

This invention relates to new fluorine-containing vinyl esters and to polymers derived therefrom.

Polymeric vinyl esters of the lower fatty acids, particularly polyvinyl acetate, have assumed great importance in many commercial applications. However, for certain purposes, the low softening temperatures of the polyvinyl esters constitute a disadvantage, and efforts have been made from time to time to overcome this defect.

This invention has as an object the preparation of vinyl fluoroacetates, and more particularly vinyl monofluoroacetate, vinyl difluoroacetate and vinyl trifluoroacetate. A further object is the polymerization of vinyl fluoroacetates. A still further object is the polymerization of said fluoroacetates in the absence of another polymerizable compound. A still further object is the preparation of interpolymers of said fluoroacetates and other polymerizable compounds. A still further object is the provision of vinyl fluoroacetate polymers of improved melting-point characteristics. Additional objects will become apparent from an examination of the following description and claims.

These and other objects and advantages are accomplished by the hereindescribed invention which broadly comprises reacting a fluoroacetic acid with acetylene; and polymerizing the resultant vinyl fluoroacetate alone or with another polymerizable compound which contains at least one ethylenic linkage.

By the expression "polymerizable compound which contains at least one ethylenic linkage," as used herein and in the appended claims, is meant an organic compound which contains at least one —C=C— double bond which is not present in a benzene nucleus, i. e., at least one ethylenic double bond, said compound having the property of polymerizing to yield high molecular weight compounds, i. e., products having a degree of polymerization greater than a trimer.

By the term "vinyl fluoroacetate polymer" as employed herein and in the appended claims we intend to denote generically not only a polymer of a vinyl fluoroacetate obtained by polymerizing a vinyl fluoroacetate free from other polymerizable material, but also an interpolymer of a vinyl fluoroacetate and one or more other polymerizable compounds which contain at least one ethylenic linkage.

The vinyl fluoroacetates of this invention are prepared by the reaction of a fluoroacetic acid with acetylene in the liquid phase and in the presence of a mercury salt. The vinyl fluoroacetates may be converted to polymers and interpolymers by means of peroxide catalysts, ultra-violet light, heat, or other agents that are effective as polymerization catalysts.

The following examples, in which proportions are given in parts by weight unless otherwise specified, are given for illustrative purposes and are not intended to place any restrictions or limitations on the herein described invention.

EXAMPLE I

PREPARATION OF VINYL TRIFLUOROACETATE

The reaction mixture consists of 290 parts of trifluoroacetic acid, 0.5 part of hydroquinone, 15 parts of red mercuric oxide, and 15 parts of mercuric sulfate. The latter is obtained by allowing a mixture of 44 parts of mercuric oxide and 20 parts of sulfuric acid to stand overnight. The reaction mixture is contained in a 3-necked spherical vessel fitted with a mercury-sealed stirrer, thermometer, condenser, and gas distributor inlet for the acetylene. The following train is used for purification of the acetylene: water, solid caustic soda, solid calcium chloride, and a trap packed in a Dry Ice-acetone mixture. The condenser is also connected to a similar trap.

The run is started by passing the acetylene through the above well-stirred reaction mixture at room temperature. The temperature is gradually raised during ½ hr. to 35° C. and during 1½ hrs. to 45° C. The temperature is then maintained at 55–60° C. for 5 hours. During the first ½ hour the mixture undergoes a series of color changes, going from red to yellow, to gray, and finally to brown. Additional 5-part portions of mercuric oxide and mercuric sulfate are added at the 5-hour period.

At the end of the 6½ hour run, the mixture is allowed to stand overnight and then vacuum-distilled into a trap surrounded by a Dry Ice-acetone mixture. The distillate is redistilled in a precision still with a 24-inch column. The product boils at 39.5–40.5° C. and the yield amounts to 202 parts. The product is allowed to stand over sodium bicarbonate for several days and redistilled. The boiling point is unchanged. The refractive index is $N_D^{25}$ 1.3151 and the density $D_4^{25}$ 1.2031. The product contains 40.99% of fluorine which is in close agreement with the theoretical value of 40.71% fluorine for vinyl trifluoroacetate.

In the same manner, vinyl monofluoroacetate and vinyl difluoroacetate can be obtained from monofluoroacetic acid and difluoroacetic acid, respectively, and acetylene.

EXAMPLE II

POLYMERIZATION OF VINYL TRIFLUOROACETATE (USING HEAT)

A solution of 1 part of benzoyl peroxide in 500 parts of vinyl trifluoroacetate is heated at 45° C. in a closed container for 21 hours in an oxygen-free atmosphere. The polymeric vinyl trifluoroacetate thus obtained is soluble in acetone, cyclohexanone, and butyl acetate. Films prepared from solutions of the polymer are colorless, transparent, and tough. The polymer is thermoplastic and can readily be molded by compression or injection methods to furnish molded articles of marked strength and toughness having softening temperatures around 70° C. A very valuable property of this polymer is its non-flammability.

In the same manner vinyl monofluoroacetate and vinyl difluoroacetate can be polymerized to polymers of similar properties.

EXAMPLE III

POLYMERIZATION OF VINYL TRIFLUOROACETATE (USING ULTRAVIOLET LIGHT)

A solution of 1.2 parts each of benzoin and benzoyl peroxide in 600 parts of vinyl trifluoroacetate is exposed in a nitrogen atmosphere to an ultraviolet light for 16 hours. The polymer thus obtained is soluble in acetone, cyclohexanone, and butyl acetate. The molding properties, toughness, and strength are similar to those of the product described in Example II.

In the same manner, vinyl monofluoroacetate and vinyl difluoroacetate can be polymerized to polymers of similar properties by means of ultraviolet light.

EXAMPLE IV

INTERPOLYMERIZATION OF VINYL TRIFLUOROACETATE WITH METHYL METHACRYLATE

A mixture of 255 parts of methyl methacrylate, 45 parts of vinyl trifluoroacetate, and 0.6 part of benzoyl peroxide is heated at 45° C. in a nitrogen atmosphere for 18 hours. The yield of interpolymer amounts to 300 parts. It is soluble in acetone, cyclohexanone and butyl acetate. Films prepared from these solutions are transparent, colorless, and tough. The interpolymer molds readily at 140° C. to give tough molded specimens having a softening temperature of 70° C. The impact strength is 0.590 foot pound per inch notch (Charpy).

In the same manner, interpolymers can be readily prepared from methyl methacrylate and vinyl monofluoroacetate, and from methyl methacrylate and vinyl difluoroacetate. These interpolymers are similar in properties to the methyl methacrylate vinyl trifluoroacetate interpolymer.

EXAMPLE V

INTERPOLYMERIZATION OF VINYL TRIFLUOROACETATE AND TETRAFLUOROETHYLENE

A mixture of 50 parts of tetrafluoroethylene, 15 parts of vinyl trifluoroacetate, and 0.4 part of benzoyl peroxide is heated at 85° C. for 5 hours. The yield of interpolymer amounts to 20 parts. It contains 1.16 moles of tetrafluoroethylene to 1 mole of vinyl trifluoroacetate.

EXAMPLE VI

INTERPOLYMERIZATION OF VINYL TRIFLUOROACETATE AND VINYL CHLORIDE

A mixture of 84 parts of copper-free water, 0.225 part of ammonium persulfate, 0.045 part of sodium bisulfite and 5.6 parts of a 30% solution of the sodium salt of sulfonated white oil is blown with nitrogen to remove air, and frozen with a mixture of Dry Ice and acetone. To the frozen mixture is added 38.25 parts of vinyl chloride and 6.75 parts of vinyl trifluoroacetate after which the air above the liquid is displaced with nitrogen and the vessel closed. It is heated with agitation at 40° C. for 48 hours, steamed to remove residual monomers, and coagulated by adding a 10% solution of aluminum sulfate. The interpolymer is filtered, washed, and dried. It molds readily to give pale amber, tough molded specimens softening at 75° C. and having impact strengths of about 0.640 foot pound per inch notch.

In the same manner interpolymers can be prepared from vinyl chloride and vinyl monofluoroacetate and from vinyl chloride and vinyl difluoroacetate. These mold readily to give tough molded specimens similar in properties to the vinyl chloride/vinyl trifluoroacetate interpolymer described above.

EXAMPLE VII

INTERPOLYMERIZATION OF ACRYLONITRILE AND VINYL TRIFLUOROACETATE

A mixture of 90 parts of vinyl trifluoroacetate, 210 parts of acrylonitrile, and 0.6 part of benzoyl peroxide is heated at 60° C. for 16 hours in an oxygen-free atmosphere. The yield of interpolymer amounts to 170 parts.

In the same manner interpolymers can be prepared from acrylonitrile with vinyl monofluoroacetate and from acrylonitrile with vinyl difluoroacetate. The flow characteristics of interpolymers containing 70% of acrylonitrile as illustrated in this example are less satisfactory than for interpolymers in which higher ratios of ester to acrylonitrile are employed, for example 70 parts of ester to 30 parts of acrylonitrile.

EXAMPLE VIII

HYDROLYSIS OF POLYVINYL TRIFLUOROACETATE

One hundred parts of polyvinyl trifluoroacetate is dissolved in acetone to give a solution having a viscosity of 5 poises. Hydrolysis of the polymer is effected by slowly adding the theoretical quantity of sodium ethylate solution while the mixture is efficiently stirred. The product which separates is insoluble in acetone but soluble in water. Films prepared from the aqueous solution of the hydrolyzed product are tough and flexible.

In the same manner, polymers and interpolymers of vinyl monofluoroacetate and vinyl difluoroacetate and interpolymers of vinyl trifluoroacetate can be partially or completely hydrolyzed by means of alkaline or acidic reagents to furnish film-forming products.

It is to be understood that the hereinbefore disclosed specific embodiments of this invention may be subject to variation and modification without departing from the scope thereof. For instance, in the preparation of the monomers of this invention, although a temperature of 55–60° C. is employed in the process of Example I, this temperature is not critical, and it may be varied in either direction. The reaction rate will depend to some extent upon the temperature. Both the total amount of catalyst and the ratio of mercuric oxide to mercuric sulfate can be varied, and if desired, other mercury salts may be employed. Inert solvents, such as aliphatic or aromatic hydrocarbons can be used to dilute the reaction mixture.

As previously stated, monofluoroacetic acid or difluoroacetic acid can be used in the process of Example I to obtain vinyl monofluoroacetate and vinyl difluoroacetate respectively.

Polymerization of vinyl monofluoroacetate, vinyl difluoroacetate, and vinyl trifluoroacetate may be effected by the usual methods such as those enumerated below.

(a) Bulk method

The monomers may be polymerized in the absence of a solvent or diluent by means of one of the common polymerization catalysts, such as benzoyl peroxide, lauroyl peroxide, diethyl peroxide, or other catalysts which are soluble in the monomer. Ultraviolet light may be used with the catalyst or in lieu thereof. Photopolymerization catalysts such as benzoin or diacetyl may be used in conjunction with ultraviolet light in the presence or absence of peroxide-type catalysts as described in copending U. S. application Serial No. 425,202, filed December 31, 1941, now U. S. Patent No. 2,367,661, by Agre. In general the rate of polymerization will be proportional to the temperature, faster rates being obtained as the temperature is increased. Optimum results are had when the temperature is within the range of from 35° C. to 40° C. and the catalyst concentration is within the range of from 0.1% to 2% based upon the weight of the monomer.

(b) Solution method

The monomer may be polymerized in a solvent, such as alcohol, benzene, acetone, toluene, dioxane, or ethyl acetate, in the presence of one of the common polymerization catalysts which is soluble in the particular solvent employed. Ultra-violet light may be used in conjunction with a catalyst or in lieu thereof, and if desired, a photopolymerization catalyst such as benzoin or diacetyl may also be employed. The rate of polymerization is proportional to the temperature, faster rates being obtained at the higher temperatures. Polymerization at the boiling point of the monomer employed is effective. From 0.1% to 2% of catalyst, based upon the weight of the monomer, is the preferred range in view of the superior products obtained therewith.

(c) Emulsion method

The monomer may be polymerized by the emulsion method by any of the modifications fully described in U. S. Patent 2,232,515. Outstanding advantages, however, are obtained by employing an emulsion system comprising ammonium persulfate or an alkali persulfate as the catalyst, an oxidizable oxygen-bearing sulfur compound as a promoter, and the sodium salt of a long-chain hydrocarbon sulfonate or a long-chain alcohol sulfate as the dispersing agent. As promoters may be mentioned sulfur dioxide, sodium bisulfite, sodium sulfite, ammonium bisulfite, sodium hydrosulfite, sodium thiosulfate, soluble salts of thionic acids, p-toluene sulfinic acid and a wide variety of other materials representing modifications of these compounds. The preferred range of catalyst concentration is from 0.1% to 2% based upon the weight of monomer. This range also applies to the oxidizable sulfur compound used as the promoter. The preferred temperature range lies between 25° C. and 60° C.

(d) Granular method

The monomer may be polymerized by the granular method according to any of the modifications described in U. S. 2,232,515 and the polymer can thereby be obtained in granular form.

Broadly speaking, this invention contemplates the production of valuable polymers obtained by polymerizing a vinyl fluoroacetate, i. e., vinyl monofluoroacetate, vinyl difluoroacetate or vinyl trifluoroacetate, or a mixture of vinyl fluoroacetates, either in the absence of another polymerizable compound or admixed with a polymerizable compound which contains at least one ethylenic linkage. More specifically, this invention comprises polymerizing a vinyl fluoroacetate with a polymerizable compound which contains at least one ethylenic linkage. Said polymerizable compound may be the vinyl fluoroacetate itself, i. e., the vinyl fluoroacetate may be polymerized in the absence of other polymerizable compound, or said polymerizable compound may be another vinyl fluoroacetate or admixture of other vinyl fluoroacetates, or some other polymerizable compound which contains at least one ethylenic linkage, or admixture of said compounds. Preferably, on account of the greater ease of polymerization, said polymerizable compound containing at least one ethylenic linkage is a polymerizable compound containing a terminal ethylenic double bond. Representative polymerizable compounds containing at least one ethylenic linkage are: the acids, anhydrides, esters, amides, and nitriles of the acrylic and methacrylic acid series, e. g., acrylic and methacrylic acids, their anhydrides, amides, nitriles and the methyl, ethyl, butyl, benzyl and phenyl esters; vinyl acetate and vinyl esters of higher carboxylic acids, e. g., butyric, lauric, stearic and benzoic acids; vinyl halides, such as the chloride, bromide and fluoride; styrene; methyl vinyl ketone; methyl isopropenyl ketone; N-vinylimides such as N-vinyl phthalimide and N-vinylsuccinimide; halogenated ethylenes, such as unsymmetrical dichloroethylene, difluoroethylene, the dichlorodifluoroethylenes, trifluoroethylene, chlorotrifluoroethylene and tetrafluoroethylene; esters of maleic, fumaric and itaconic acids; the polyhydric alcohol esters of methacrylic and acrylic acids, such as ethylene glycol dimethacrylate and hexamethylene glycol dimethacrylate; dimethallyl carbonate; ethylidene dimethacrylate; and hexamethylene dimethacrylamide.

In conducting the process of polymerization of a vinyl fluoroacetate, either in the absence of or with another polymerizable compound, any of the methods described above may be employed including bulk, solution, emulsion, and granulation processes. In general the catalyst concentration is within the range of from 0.1% to 2% based upon the total weight of monomers used. The most effective temperatures lie within the range of from 30° C. to 60° C. since these give high molecular weight polymers at relatively rapid rates. Greater polymerization speeds are obtainable at higher temperatures but usually with some sacrifice in the molecular weight. It is usually advantageous to displace the air in the systems and in the free space above the mixtures with an inert atmosphere such as nitrogen or carbon dioxide. In the solution process, the ratio of monomers to solvent can be varied in accordance with the principle that higher dilutions result in slower rates and produce lower molecular weights. In the emulsion and granulation methods, the ratios of the dispersed phase (mixture of monomers) to water may be widely varied. Convenient and satisfactory amounts of water are within the range of from 100% to about 300% of the dispersed phase. When the granulation method of polymerization is employed, highly effective stirring is essential. For the bulk and solution methods, stirring is optional. In the emulsion method, the effectiveness of the dispersing agent, especially if small concentrations are employed, may be enhanced by agitation of the mixture.

When two or more polymerizable monomers are polymerized, the present invention contemplates the addition of the entire amount of the two or more polymerizable compounds to the aqueous or other medium followed by subsequent polymerization. It is well known that the polymerization rates of the monomers operable in this invention may vary to a considerable extent, and it may therefore be found in some cases that the products may be characterized by non-homogeneity and other inferior physical properties. Under these conditions, the polymerization process may be modified by mixing initially all of the more slowly polymerizing material and a small amount of the more rapidly polymerizing material, and thereafter adding small portions of the more rapidly polymerizing material at about the rate at which this material is used up.

The isolation of the polymers of this invention will depend upon the method of polymerization employed. When the bulk or casting method of polymerization is employed, the finished polymer is obtained directly and no purification or subsequent treatment is usually necessary other than vacuum drying or seasoning. When the solution method of polymerization is used, the polymer may be isolated by evaporation of the solvent or by pouring the solution into an excess of non-solvent for the polymer, whereby the latter is precipitated. The precipitated polymer may then be thoroughly washed and dried. When the granulation method of polymerization is employed, the only purification required is to filter the product by suitable means, thoroughly wash with distilled water, and dry. When the emulsion method of polymerization is employed, the polymers may be isolated as finely divided powders by a variety of methods. For example, the dispersion may be sprayed into a heated and/or evacuated chamber whereby the water is removed as vapor and the polymer falls to the bottom of the chamber. The product may also be isolated by cooling the dispersion below the freezing point of the aqueous medium or by the addition of a large volume of a lower aliphatic alcohol, such as methanol or ethanol. The most satisfactory method consists in adding an appropriate amount of an electrolyte solution to the diluted aqueous dispersion with rapid agitation at a temperature just below the point at which the precipitated particles tend to cohere. Suitable electrolytes include sodium chloride, sodium sulfate, hydrochloric acid, phosphoric acid, calcium chloride, magnesium sulfate, lead nitrate, lead acetate, stannous chloride and aluminum sulfate. After precipitation of the polymer, it is filtered and washed repeatedly with water to remove traces of electrolytes and dispersing agent which may adhere to the particles.

When polymerizing a vinyl fluoroacetate or admixture of vinyl fluoroacetates with another polymerizable compound or admixture of other polymerizable compounds, the ratio of vinyl fluoroacetate compounds to other polymerizable material may be varied within relatively wide limits. However, the mixture of polymerizable compounds subjected to polymerization should contain at least 10% by weight of a vinyl fluoroacetate or admixture of vinyl fluoroacetates. Polymeric products superior for most purposes are had when said mixture contains at least 30% by weight of a vinyl fluoroacetate or admixture of vinyl fluoroacetates; while polymeric products having optimum properties result when said mixture contains more than 50% by weight of a vinyl fluoroacetate or admixture of vinyl fluoroacetates.

As hereinbefore stated, the ratio by weight of vinyl fluoroacetate to other polymerizable material in the vinyl fluoroacetate polymers of this invention is at least 1:9. For most purposes, however, said ratio should be at least 3:7; while vinyl fluoroacetate polymers having optimum properties are those in which said ratio is greater than 5:5.

The vinyl fluoroacetate polymers of this invention have superior melting point characteristics and are well adapted to application as film-forming materials. Thus there may be had from said polymers: films which are colorless, strong, tough and flexible; solutions of said polymers which provide films having excellent adhesion on wood, glass and metals; unpigmented solutions of said polymers which are useful as clear lacquers, varnishes, or as adhesives, and pigmented solutions which are suitable for coating compositions, such as paints, pigmented lacquers for wood, metal, paper and the like; unpigmented solutions, emulsions or dispersions of said polymers which are suitable for impregnating or coating paper, textiles, fibers, wood or other porous or semi-porous materials to contribute such properties as strength, toughness, flexibility, and impermeability to water. Furthermore, there may be obtained from said polymers films and sheetings which are useful as transparent wrapping materials. Vinyl trifluoroacetate polymers are particularly valuable for this purpose in view of their non-flammability. The instant invention also provides polymers which are adapted to molding by heat and pressure; and polymers with flowing characteristics such that they are well adapted for injection molding.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A vinyl trifluoroacetate polymer.
2. A vinyl trifluoroacetate homopolymer.
3. An interpolymer of vinyl trifluoroacetate with another ethylenically unsaturated polymerizable compound which contains not more than two non-conjugated ethylenic linkages, said interpolymer containing from 15% to 70% by weight of vinyl trifluoroacetate.

BENJAMIN W. HOWK.
RALPH A. JACOBSON.

REFERENCES CITED

The following references are of record in the file of this patent:

UNITED STATES PATENTS

| Number | Name | Date |
|---|---|---|
| 1,084,581 | Klatte (1) | Jan. 13, 1914 |
| 1,241,738 | Klatte et al. (2) | Oct. 2, 1917 |
| 2,266,996 | Scott et al. | Dec. 23, 1941 |
| 2,269,187 | D'Alelio | Jan. 6, 1942 |

OTHER REFERENCES

Beilstein, Handbuch der Organischen Chemie, vol. 2, pages 185–186, fourth edition, Berlin 1942 (Edwards 1943).

Mellor, Modern Inorganic Chemistry, pages 352–354, published by Longmans, N. Y., 1930.